United States Patent [19]

Johnstone

[11] 4,397,762

[45] Aug. 9, 1983

[54] POLYMERIZATION CATALYST

[75] Inventor: Alexander Johnstone, Shenhousemuir, Scotland

[73] Assignee: BP Chemicals Limited, London, England

[21] Appl. No.: 343,249

[22] Filed: Jan. 27, 1982

[51] Int. Cl.$^3$ .............................. C08F 4/02; C08F 4/64
[52] U.S. Cl. .............................. 252/429 B; 252/429 C; 526/116; 526/124
[58] Field of Search ........................ 252/429 B, 429 C

[56] References Cited

U.S. PATENT DOCUMENTS

| | | | |
|---|---|---|---|
| 3,594,330 | 7/1971 | Delbouille et al. | 252/429 C |
| 3,745,154 | 7/1973 | Kas hiwa | 252/429 C X |
| 3,855,324 | 12/1974 | Mertzweiller et al. | 252/429 C X |
| 4,333,851 | 6/1982 | Speakman et al. | 252/429 B |

FOREIGN PATENT DOCUMENTS

| | | |
|---|---|---|
| 22658 | 1/1981 | European Pat. Off. |
| 1256851 | 12/1971 | United Kingdom |
| 1306044 | 2/1973 | United Kingdom |
| 1314005 | 4/1973 | United Kingdom |
| 1484254 | 9/1977 | United Kingdom |
| 2018788A | 10/1979 | United Kingdom |
| 1569901 | 6/1980 | United Kingdom |
| 2049709A | 12/1980 | United Kingdom |
| 2053939A | 2/1981 | United Kingdom |
| 1593465 | 7/1981 | United Kingdom |

*Primary Examiner*—Patrick Garvin
*Attorney, Agent, or Firm*—Brooks, Haidt, Haffner & Delahunty

[57] ABSTRACT

A supported Ziegler catalyst prepared by the following steps, carried out under anhydrous conditions:

(A) reacting a hydroxyl groups-containing support material comprising magnesium silicate or silica and magnesia with one or more organo-metallic compounds having the general formula $MR^1_aQ_{b-a}$ wherein M is a metal which is aluminium, boron, lithium, zinc or magnesium, $R^1$ is a hydrocarbyl group, Q is halogen or an oxyhydrocarbyl group, b is the valency of M and a is an integer from 1 to b, (B) removing unreacted organometallic compound, if any, from the produced solid material, (C) impregnating the solid material obtained from step B with one or more halogen-containing transition metal compounds wherein the transition metal(s) comprise titanium, vanadium or zirconium.

13 Claims, No Drawings

POLYMERIZATION CATALYST

The present invention relates to a supported Ziegler catalyst for polymerising 1-olefins and to a process for polymerising 1-olefins employing the catalyst.

It has long been known that 1-olefins such as ethylene can be polymerised by contacting them under polymerisation conditions with a catalyst obtained by activating a transition metal-containing component, e.g. a titanium compound such as titanium tetrachloride, with an activator or co-catalyst, e.g. an organo-metallic compound such as triethylaluminium. Catalysts comprising the transition metal-containing component and the co-catalyst or activator are generally referred to in the art as "Ziegler catalysts" and this terminology will be used throughout this specification.

The Ziegler catalyst component comprising the transition metal can be used either in an unsupported condition, or supported on support materials such as silicon carbide, calcium phosphate, silica, magnesium carbonate or sodium carbonate.

UK Patent Specification No: 1,256,851 discloses a catalyst for the low-pressure polymerisation and copolymerisation of olefins, comprising:

(a) an organometallic compound, or an organosilicon compound having at least one Si-H bond, and (b) a solid product obtained by reacting a substantially anhydrous support consisting of a solid bivalent-metal compound with an organometallic compound, or an organosilicon compound having at least one Si-H bond, this being either identical to or different from "(a)", separating the solid product resulting from the reaction, reacting this product with a halogenated derivative of a transition metal, and separating the final solid reaction product; the molar ratio of "(a)" to the transition metal chemically bonded to the support being at least 2.

UK Patent Specification No. 1,306,044 relates inter alia to a process for polymerising alpha-olefins using a catalyst comprising an organometallic compound and the solid product obtained by reacting silica or alumina with an excess of a compound of the formula $MR_nX_{m-n}$ wherein M is aluminium or magnesium, R is a hydrocarbon radical, X is hydrogen or halogen, m is the valency of M and n is a whole number not greater than m, separating and washing the solid product and reacting it with an excess of a halogen-containing transition metal compound and separating the solid reaction product.

UK Patent Specification No. 1,351,488 discloses a catalyst composition, for polymerising 1-olefins, comprising (A) a component prepared in an inert atmosphere by (a) treating a mixture of a hydrocarbon solvent and, as carrier, a finely divided solid calcium or magnesium inorganic compound other than calcium carbonate which compound does not contain halogen and which is substantially insoluble in the hydrocarbon solvent, with 0.05 to 10 millimols, per gram of the calcium magnesium compound, of an organoaluminium compound, (b) treating the product of (a) with a vanadium halide or with a mixture of a vanadium halide and a titanium halide containing not more than 5 mols, per mol of vanadium halide, of titanium halide; the total mols of vanadium or of vanadium and titanium added being 0.001 to 1 mol/mol of organo groups in the organoaluminium compound; and (c) allowing the ingredients to react and, if necessary removing unreacted vanadium and/or titanium halide to provide a reaction product which is substantially free from unreacted vanadium and titanium halide; and (B) an organoaluminium compound.

It is an object of the present invention to provide an improved supported Ziegler catalyst.

Accordingly the present invention provides a supported Ziegler catalyst prepared by the following steps, carried out under anhydrous conditions:

(A) reacting a hydroxyl groups-containing support material comprising magnesium silicate or silica and magnesia with one or more organometallic compounds having the general formula $MR^1_aQ_{b-a}$ wherein M is a metal which is aluminium, boron, lithium, zinc or magnesium, $R^1$ is a hydrocarbyl group, Q is halogen or an oxyhydrocarbyl group, b is the valency of M and a is an integer from 1 to b, (B) removing unreacted organometallic compound, if any, from the produced solid material, (C) impregnating the solid material obtained from step B with one or more halogen-containing transition metal compounds wherein the transition metal(s) comprise titanium, vanadium or zirconium.

Throughout this specification, boron is regarded as a metal. The support material employed in step A in the preparation of the catalyst of the present invention is preferably an intimate mixture of silica and magnesia or a coprecipitate of silica and magnesia. The preparation of coprecipitated silica-magnesia is well known in the art. Coprecipitates of silica and magnesia are commercially available. Intimate mixtures of silica and magnesia can be prepared, for example by ball milling a mixture of the two oxides. A further method of forming a support material comprising silica and magnesia suitable for use in the present invention comprises heating a mixture of a particulate silica support material and a magnesium compound which decomposes at least partially into magnesia on heating. Examples of magnesium compounds which can be suitably heated with silica in this manner are magnesium alkoxides, e.g. magnesium ethoxide, magnesium alkyls, e.g. dibutyl magnesium, magnesium hydroxide, magnesium carbonate and magnesium nitrate. In the present invention it is preferred to use a coprecipitated silica-magnesia as the support material.

The atomic ratio of silicon:magnesium in the support material employed in the present invention is suitably in the range 100:1 to 1:100, preferably 20:1 to 1:20.

The support material should be substantially dry before reacting with the organometallic compound and is preferably dried by heating for several hours in a vacuum oven at a temperature in the range 70° to 150° C. Heating overnight in vacuo at about 150° C. normally gives adequate drying.

The organometallic compound used to prepare the catalyst of the present invention must contain at least one metal-carbon bond. Preferred organometallic compounds are trihydrocarbyl aluminium, trihydrocarbyl boron, dihydrocarbyl zinc or magnesium and hydrocarbyl lithium compounds. Examples of organometallic compounds which can be employed are triethyl aluminium, isoprenyl aluminium, diethyl aluminium chloride, diethyl aluminium ethoxide, triethyl boron, dibutyl magnesium, ethyl magnesium bormide, diethyl zinc and butyl lithium. Aluminium trialkyls are particularly preferred, especially those containing 1 to 10 carbon atoms in each alkyl group.

The quantity of organometallic compound employed in step A is suitably in the range 0.1 to 10 moles, preferably 0.5 to 1.5 moles per mole of surface hydroxyl groups on the support material.

The reaction between the organometallic compound and the support material can be conducted in any desired manner provided that the reaction mixture is substantially free from water and other materials containing reactive groups which react with the organometallic compound. The reaction can be conducted in the presence of an inert diluent or solvent for the organometallic compound if desired. Examples of suitable solvents are liquid hydrocarbons, for example, cyclohexane or normal-hexane. The reaction is preferably carried out in a solvent at a temperature between ambient and the boiling point of the solvent, for example at a temperature in the range 10°–80° C., although temperatures above or below this range can be employed if desired. The reaction between the organometallic compound and the support material generally occurs rapidly at ambient temperature and a reaction time of one hour or less is normally adequate although longer times can be employed if desired.

After the reaction between the organometallic compound and the support material is substantially complete, the unreacted (i.e. unadsorbed) organometallic compound, if any, is separated in step B from the solid product from step A. The separation is preferably achieved by washing the solid product with an anhydrous inert solvent, for example, cyclohexane, normal-hexane or petroleum ether. The solid product must be protected from contact with other substances with which it may deleteriously react, for example air.

In step C the solid product is impregnated with one or more halogen-containing titanium compounds and/or one or more halogen-containing vanadium compounds and/or one or more halogen-containing zirconium compounds wherein the titanium is preferably tetravalent, the vanadium is preferably tetra- or pentavalent and the zirconium is preferably tetravalent. Preferably these compounds are selected from compounds having the general formulae $DX_m$, $DOX_{(m-2)}$ and $D(OR^2)_n X_{m-n}$ wherein D is the titanium, vanadium or zirconium; X is halogen, preferably chlorine; O is oxygen; $R^2$ is a hydrocarbyl group, for example alkyl, aryl or cycloalkyl, preferably containing 1–10 carbon atoms; m is the valency of D; and n is an integer from 1 to m-1. Examples of suitable titanium compounds are titanium tetrachloride, trichloro-titanium ethylate, dichlorotitanium diisopropylate and titaniumoxychloride. Examples of suitable vanadium compounds are vanadyl chloride and vanadium tetrachloride. Examples of suitable zirconium compounds are zirconium tetrachloride and zirconyl chloride. Titanium tetrachloride and vanadyl chloride are preferred.

The quantity of transition metal compound employed in preparing the catalyst of the present invention is suitably 0.1 to 10 moles, preferably 0.25 to 1.5 moles, most preferably 0.4 to 1.0 moles per mole of organometallic compound residue bound to the support surface. The quantity of organometallic compound residue bound to the support surface can conveniently be determined by conventional analytical techniques, for example, elementary analysis. When it is desired to use titanium and vanadium compounds preferably the atomic ratio of Ti:V is in the range 100:1 to 1:100 most preferably 5:1 to 1:5. When more than one transition metal compound is employed, the impregnation step C can be carried out by impregnating the solid product from step B with the transition metal compounds separately or together. It is preferred to impregnate using a mixture of the titanium and vanadium compounds. The impregnation can be carried out using the neat (undiluted) transition metal compound or by dissolving one or more of them in an inert solvent for example a liquid hydrocarbon solvent. The inert solvent, when used, must be free from functional groups capable of reacting with the solid material obtained from step B and the transition metal compound. Cyclohexane is an example of a suitable inert solvent. The impregnation step is preferably carried out by contacting the solid material obtained from step B with the transition metal compound at a temperature in the range 10° to 150° C. It is particularly preferred to carry out the impregnation by stirring the mixture of said solid material and transition metal compound in an inert solvent at a temperature in the range 10° to 30° C. The contacting in the impregnation step C is preferably carried out for a time in the range 10 minutes to 24 hours.

Preferably, the catalyst obtained from step C is separated from any unadsorbed transition metal compound by conventional means, for example, washing with dry inert solvent, or, if a volatile transition metal compound has been employed, by purging with inert gas, e.g. nitrogen, helium or argon. Preferably the separation is carried out by washing the catalyst component several times with aliquots of dry hydrocarbon solvent. The catalyst may be stored as the dry material in a suitable non-reactive atmosphere, e.g. argon, nitrogen or other inert gas, or as a slurry in inert solvent.

The present invention further comprises a process for polymerising one or more 1-olefins comprising contacting the monomer under polymerisation conditions with the catalyst component of the present invention preferably in the presence of a Ziegler catalyst activator. Ziegler catalyst activators and the methods is which they are used to activate Ziegler catalysts are well known. Ziegler catalyst activators are organometallic derivatives or hydrides of metals of Groups I, II, III, and IV of the Periodic Table. Particularly preferred are trialkyl aluminium compounds or alkylaluminium halides, for example triethylaluminium, tributylaluminium and diethylaluminium chloride. When a Ziegler catalyst activator is employed, preferably it is present in an amount such that the atomic ratio of metal atoms in the activator:total transition metal supported on the catalyst support is not greater than 10:1.

The polymerisation process of the present invention can be applied to the homopolymerisation of 1-olefins, e.g. ethylene or propylene, or to the copolymerisation of mixtures of 1-olefins, e.g. ethylene with propylene, 1-butene, 1-pentene, 1-hexene, 4-methylpentene-1, 1,3-butadiene or isoprene. The process is particularly suitable for the homopolymerisation of ethylene or the copolymerisation of ethylene with up to 40% weight (based on total monomer) of comonomers.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium, use can be made of an inert hydrocarbon which is liquid under the polymerisation conditions, or of the monomer or monomers themselves maintained in the liquid state under their saturation pressure. The polymerisation can if desired be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3-30 carbon atoms per molecule. Suitable diluents include for example isopentane, isobutane, and cyclohexane. Isobutane is preferred.

Methods of recovering the product polyolefin are well known in the art.

The polymerisation catalyst of the present invention can be used to make high density ethylene polymers and copolymers at high productivity having properties which render them suitable for a variety of applications. By varying the amounts of transition metal compounds and/or organometallic compound used in steps A and C of the catalyst preparation, control can be exercised over the molecular weight distribution of polyolefins prepared over the catalyst.

The invention is further illustrated by the following Examples and Comparative Test.

The melt index ($MI_{2.16}$) and high load melt index ($MI_{21.6}$) were determined according to ASTM method 1238 using 2.16 kg and 21.6 kg loads repsectively; the units are grams per 10 minutes. Kd is determined by a method similar to that disclosed in Sabia, R., J. Appl. Polymer Sci. 1963,7, 437.

EXAMPLES 1&2—CATALYST PREPARATION

The following procedure was used for the preparation of the catalysts. The quantities of the reagents used and analyses of the dried catalysts are shown in Table 1.

In step A silica-magnesia (Davison Grade 300) was dried overnight under vacuum at 150° C. 10 g of the dried material was suspended in dry cyclohexane (150 ml) in a vessel purged with dry nitrogen and a 10% w/w solution of triethylaluminium in hexane added dropwise, with stirring. The suspension was stirred for 90 min after the addition was complete, and then allowed to settle. The supernatant liquor was decanted off, (step B), and 150 ml of fresh dry cyclohexane added. In step C, a mixture of titanium tetrachloride and vanadium oxytrichloride dissolved in dry cyclohexane (60 ml) was added dropwise, with stirring, to the reaction vessel. Stirring was continued for 90 min after the addition was complete. The catalyst was washed with cyclohexane (180 ml) and the volume made up to ca. 350 ml with fresh dry cyclohexane. The catalyst was used as a slurry and stored under nitrogen.

Polymerisation

Polymerisation was carried out in a 2.3 liter capacity stainless steel stirred autoclave. The reactor was purged with dry nitrogen, baked for 2 hours at 110° C. and then cooled to 75° C. The catalyst slurry was added to the reactor using a syringe. Triethyl aluminium (0.5 ml of a 10% weight/weight solution of AlEt3 in hexane) was added to improve the catalyst activity, together with isobutane (1 liter). The vessel was reheated to 90° C. and hydrogen (6.9 bar) was introduced. Then ethylene was introduced to bring the total pressure in the reactor to 41.4 bar, and further ethylene was introduced throughout the duration of the polymerisation to maintain the pressure at 41.4 bar. The polymerisation temperature was 90° C.

At the end of the polymerisation (1 hour) the diluent and unreacted ethylene were vented off and the polyethylene powder recovered. The polyethylene was washed with acetone and treated with conventional stabilizer and the properties (see Table 2) measured using standard procedures. It can be seen from Examples 1 and 2 that the catalyst according to the present invention polymerises ethylene at high activity to give polymer having a fairly broad molecular weight distribution (MWD). In both Examples, a catalyst containing both titanium and vanadium was employed and it can be seen that the catalyst having the lower Ti:V ratio gave polymer having broader MWD (high Kd is indicative of broad MWD).

Comparative Test; Catalyst Preparation

The catalyst was prepared in the same manner as the catalysts in Examples 1 and 2, except that silica (Davison 951 Grade) was used in place of silica magnesia. The quantities of reagents used were as in Example 1 (ie 10 g support material, 3.9 g AlEt3, 0.35 g TiCl and 1.25 g VOCl3). Analysis of the dried catalyst showed it to contain 6.2% Al, 0.84% Ti, 2.5% V and 6.6% Cl.

Polymerisation

Polymerisation was carried out using the procedure described for Examples 1 and 2. Using 124 mg of catalyst, only 68 g of polymer were produced after 1 h, corresponding to an activity of 550 kg/kg/h. The polymer produced has $MI_{2.16}=0.58$ g/10 min, $MI_{21.6}=33.2$ g/10 min and Kd=7.4.

TABLE 1

| Example | Wt AlEt3 (g) | Wt TiCl4 (g) | Wt VOCl3 (g) | Analysis | | | |
|---|---|---|---|---|---|---|---|
| | | | | % Al | % Ti | % V | % Cl |
| 1 | 3.0 | 0.35 | 1.25 | 9.4 | 1.2 | 2.7 | 6.7 |
| 2 | 3.0 | 1.08 | 0.64 | 8.5 | 1.9 | 1.3 | 7.3 |

TABLE 2

| Example | Catalyst weight (mg) | Polymer Yield (g) | Activity (kg/kg/h) | $MI_{2.16}$ (g/10 min) | $MI_{21.6}$ (g/10 min) | Kd |
|---|---|---|---|---|---|---|
| 1 | 100 | 130 | 1300 | 0.22 | 18.6 | 14.8 |
| 2 | 91 | 144 | 1580 | 0.30 | 12.9 | 2.6 |

I claim:
1. A supported Ziegler catalyst prepared by the following steps, carried out under anhydrous conditions:
  (A) reacting a hydroxyl groups-containing support material comprising magnesium silicate or silica and magnesia with one or more organometallic compounds having the general formula $MR^1_a Q_{b-a}$ wherein M is a metal which is aluminium, boron, lithium, zinc or magnesium, $R^1$ is a hydrocarbyl group, Q is halogen or an oxyhydrocarbyl group, b is the valency of M and a is an integer from 1 to b,
  (B) removing unreacted organometallic compound, if any, from the produced solid material,
  (C) impregnating the solid material obtained from step B with one or more halogen-containing transition metal compounds wherein the transition metal (s) comprise titanium, vanadium or zirconium.

2. A catalyst as claimed in claim 1 wherein the hydroxyl groups-containing support material is a coprecipitated silica-magnesia.

3. A catalyst as claimed in claim 1 or claim 2 wherein the atomic ratio of silicon:magnesium in the support material is in the range 20:1 to 1:20.

4. A catalyst as claimed in claim 1 or claim 2 wherein the organometallic compound employed in step A is a trihydrocarbyl aluminium, a trihydrocarbyl boron, a dihydrocarbyl zinc, a dihydrocarbyl magnesium or a hydrocarbyl lithium compound.

5. A catalyst as claimed in claim 1 or claim 2 wherein the organometallic compound employed in step A is triethylaluminium.

6. A catalyst as claimed in claim 1 or claim 2 wherein the quantity of organometallic compound employed in step A is in the range 0.5 to 1.5 moles per mole of surface hydroxyl groups on the support material.

7. A catalyst as claimed in claim 1 or claim 2 wherein, in step B, unreacted organometallic compound is removed from the solid material produced in step A by washing the solid material with an anhydrous inert solvent.

8. A catalyst as claimed in claim 1 or claim 2 wherein the one or more halogen-containing transition metal compounds employed in step C are selected from compounds having the general formulae $DX_m$, $DOX_{(m-2)}$ and $D(OR^2)_n X_{m-n}$ wherein D is the titanium, vanadium or zirconium: X is halogen, O is oxygen, $R^2$ is a hydrocarbyl group containing 1 to 10 carbon atoms: m is the valency of D: and n is an integer from 1 to m-1.

9. A catalyst as claimed in claim 1 or claim 2 wherein the transition metal compound is titanium tetrachloride or vanadyl chloride.

10. A catalyst as claimed in claim 1 or claim 2 wherein the quantity of transition metal compound employed in step C is in the range 0.25 to 1.5 moles per mole of organometallic compound residue bound to the support surface.

11. A catalyst as claimed in claim 1 or claim 2 wherein the one or more halogen-containing transition metal compounds employed in step C comprises a mixture of titanium and vanadium compounds.

12. A catalyst as claimed in claim 11 wherein the titanium compound is titanium tetrachloride and the vanadium compound is vanadyl chloride ($VOCl_3$).

13. A catalyst as claimed in claim 1 or claim 2 wherein the catalyst product obtained from step C is washed with dry inert solvent to remove any unadsorbed transition metal compound.

* * * * *